(12) United States Patent
Lin et al.

(10) Patent No.: US 10,146,001 B2
(45) Date of Patent: Dec. 4, 2018

(54) LIGHTING SYSTEM

(71) Applicant: Lextar Electronics Corporation, Hsinchu (TW)

(72) Inventors: Yu-Min Lin, New Taipei (TW); Tsung-Huan Tsai, Taipei (TW); Mong-Ea Lin, Taichung (TW)

(73) Assignee: LEXTAR ELECTRONICS CORPORATION, Hsinchu (TW)

(*) Notice: Subject to any disclaimer, the term of this patent is extended or adjusted under 35 U.S.C. 154(b) by 0 days.

(21) Appl. No.: 15/498,519

(22) Filed: Apr. 27, 2017

(65) Prior Publication Data

US 2017/0343718 A1  Nov. 30, 2017

(30) Foreign Application Priority Data

May 31, 2016 (TW) .............. 105117059 A (51) Int. Cl.
| | |
|---|---|
| *F21V 8/00* | (2006.01) |
| *F21V 5/04* | (2006.01) |
| *F21V 5/00* | (2018.01) |
| *B61D 29/00* | (2006.01) |
| *G02B 6/42* | (2006.01) |

(Continued)

(52) U.S. Cl.
CPC .......... *G02B 6/0001* (2013.01); *B61D 29/00* (2013.01); *F21S 41/24* (2018.01); *F21V 5/008* (2013.01); *F21V 5/04* (2013.01); *G02B 6/4206* (2013.01); *F21S 41/143* (2018.01); *F21S 41/25* (2018.01); *F21Y 2115/10* (2016.08)

(58) Field of Classification Search
CPC ... G02B 6/001; G02B 6/4206; F21S 48/1241; F21V 5/008; F21V 5/04; B61D 29/00
See application file for complete search history.

(56) References Cited

U.S. PATENT DOCUMENTS

| | | |
|---|---|---|
| 6,819,505 B1 | 11/2004 | Cassarly et al. |
| 7,201,499 B2 | 4/2007 | Komatsu |

(Continued)

FOREIGN PATENT DOCUMENTS

| | | |
|---|---|---|
| DE | 102008049168 A | 4/2010 |
| DE | 102011118270 A1 | 6/2012 |

(Continued)

OTHER PUBLICATIONS

TIPO Office Action dated Mar. 28, 2017 in corresponding Taiwan application (No. 105117059).

(Continued)

*Primary Examiner* — Anabel Ton
(74) *Attorney, Agent, or Firm* — McClure, Qualey & Rodack, LLP (57) ABSTRACT

A lighting system including a LED light source, a convex lens, and a light guide post disposed between the LED light source and the convex lens. The light guide post includes a light emitting portion and a light collecting portion connected to the light emitting portion. The light emitting portion has a light guide post-light emitting surface facing the convex lens. The light collecting portion has an internal reflective surface including at least an elliptical surface having a first focal point and a second focal point. The second focal point is located between the first focal point and the convex lens, and the second focal point is located inside the light guide post.

10 Claims, 7 Drawing Sheets

(51) Int. Cl.
*F21S 41/24* (2018.01)
*F21Y 115/10* (2016.01)
*F21S 41/143* (2018.01)
*F21S 41/25* (2018.01)

(56) References Cited

U.S. PATENT DOCUMENTS

| | | | |
|---|---|---|---|
| 8,534,890 B2* | 9/2013 | Goto | G02B 6/0006 |
| | | | 362/551 |
| 8,944,649 B2 | 2/2015 | Fedosik et al. | |
| 2005/0201100 A1 | 9/2005 | Cassarly et al. | |
| 2006/0039160 A1 | 2/2006 | Cassarly et al. | |
| 2014/0268813 A1 | 9/2014 | Maa et al. | |
| 2016/0178155 A1* | 6/2016 | Owada | F21S 48/1329 |
| | | | 362/465 |

FOREIGN PATENT DOCUMENTS

| | | |
|---|---|---|
| JP | 2001179305 A | 7/2001 |
| JP | 2005259532 A | 9/2005 |
| JP | 2008293797 A | 12/2008 |
| JP | 2010146745 A | 7/2010 |
| WO | 2010042185 A1 | 4/2010 |

OTHER PUBLICATIONS

EPO Search Report dated Oct. 30, 2017 in EP Application (No. 17172224.2-1762).
JP Office Action dated Apr. 30, 2018 in JP application (No. 2017106716).

* cited by examiner

LIGHTING SYSTEM

This application claims the benefit of Taiwan application Serial No. 105117059, filed May 31, 2016, the subject matters of which are incorporated herein by reference.

BACKGROUND OF THE INVENTION

Field of the Invention

The present invention relates in general to a lighting system, and particularly relates to a lighting system including a light guide post.

Description of the Related Art

In present days, illumination systems with high lighting intensities in the market are mostly used in projecting lamps or fast-moving vehicles, such as trains, high-speed rails, and etc. However, most of these illumination systems still use traditional thermal lights currently, such that of which the designs commonly require arranging lenses with metallic parabolic reflection cups or ellipsoid reflection cups.

However, traditional thermal lights are less beneficial to the energy-saving requirements, and metallic reflection cups increase the overall weight as well as volume of illumination systems.

SUMMARY OF THE INVENTION

The present invention relates to a lighting system, the light emitting portion of the light guide post is helpful for increasing light emitting efficiency, and the internal reflective surface of the light collecting portion of the light guide post includes at least an elliptical surface of which the second focal point is located inside the light guide post, such that it is easier to confirm the position of the second focal point, and thus it is further advantageous to disposing the convex lens.

According to a concept of the present invention, a lighting system is provided. The lighting system includes an LED light source, a convex lens, and a light guide post disposed between the LED light source and the convex lens. The light guide post includes a light emitting portion and a light collecting portion connected to the light emitting portion. The light emitting portion has a light guide post-light emitting surface facing the convex lens. The light collecting portion has an internal reflective surface, and the internal reflective surface includes at least an elliptical surface. The elliptical surface has a first focal point and a second focal point, the second focal point is located between the first focal point and the convex lens, and the second focal point is located inside the light guide post.

The above and other aspects of the invention will become better understood with regard to the following detailed description of the preferred but non-limiting embodiment(s). The following description is made with reference to the accompanying drawings.

DETAILED DESCRIPTION OF THE INVENTION

In the present invention, a lighting system is provided. The light emitting portion of the light guide post is helpful for increasing light emitting efficiency, and the internal reflective surface of the light collecting portion of the light guide post includes at least an elliptical surface of which the second focal point is located inside the light guide post, such that it is easier to confirm the position of the second focal point, and thus it is further advantageous to disposing the convex lens.

The illustrations may not be necessarily drawn to scale, and there may be other embodiments of the present disclosure which are not specifically illustrated. Thus, the specification and the drawings are to be regard as an illustrative sense rather than a restrictive sense. Moreover, the descriptions disclosed in the embodiments of the disclosure such as detailed construction, manufacturing steps and material selections are for illustration only, not for limiting the scope of protection of the disclosure. The steps and elements in details of the embodiments could be modified or changed according to the actual needs of the practical applications. The disclosure is not limited to the descriptions of the embodiments. The illustration uses the same/similar symbols to indicate the same/similar elements.

Figure 1:
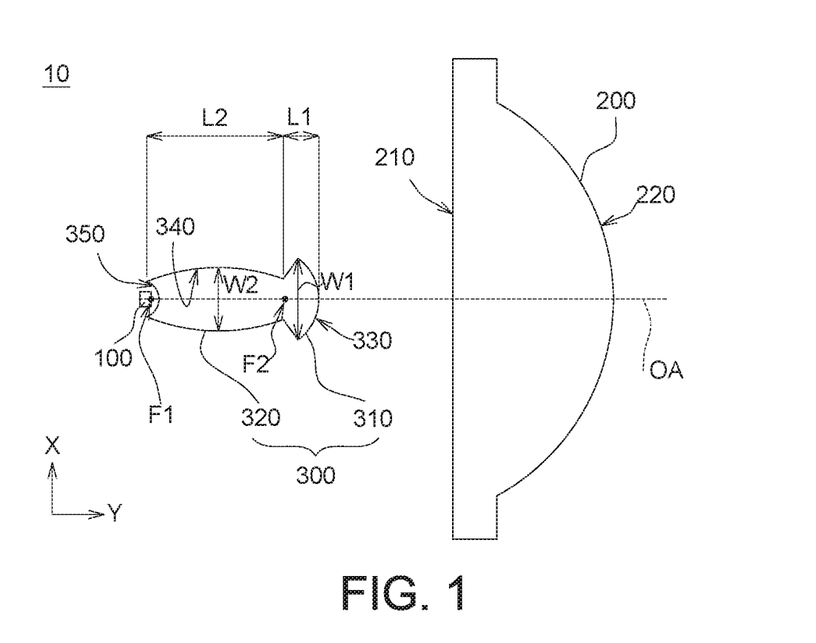
FIG. 1 shows a schematic drawing of a lighting system according to an embodiment of the present invention.
Figure 2A:
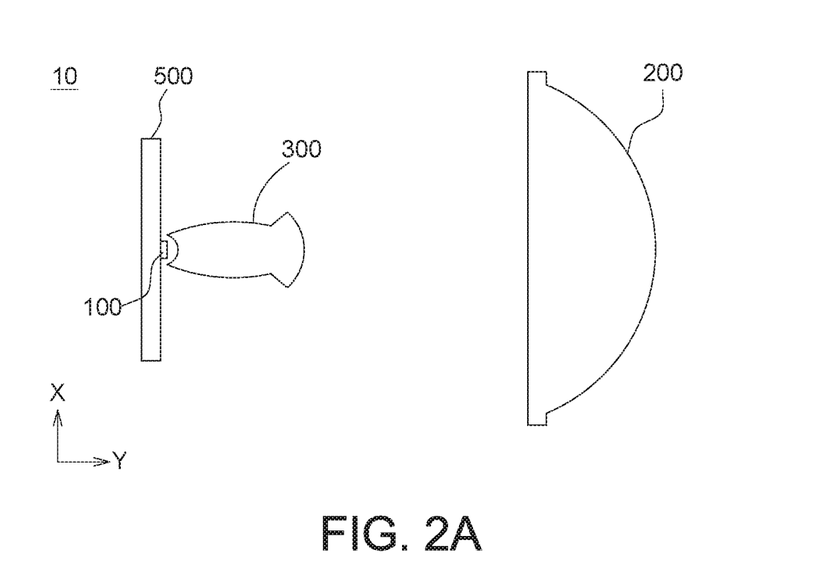
FIGS. 2A and 2B show cross-sectional views along X-Y plane and Y-Z plane respectively of a lighting system according to an embodiment of the present invention.
Figure 2B:
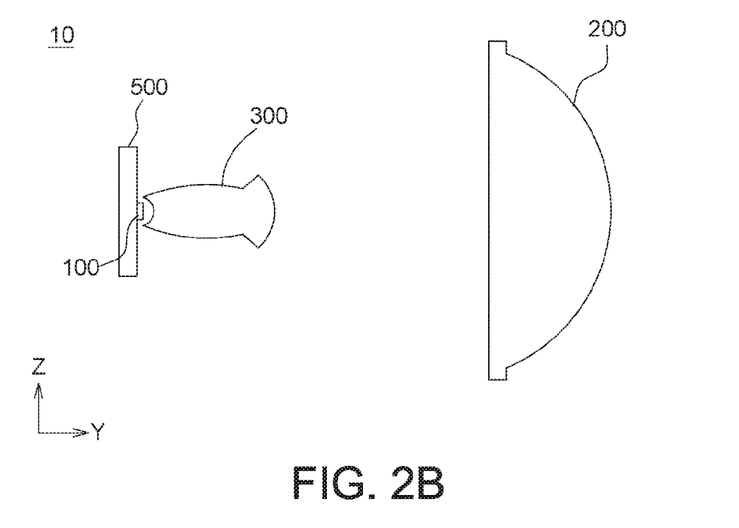

Please refer to FIGS. 1 and 2A-2B, FIG. 1 shows a schematic drawing of a lighting system 10 according to an embodiment of the present invention, and FIGS. 2A and 2B show cross-sectional views along X-Y plane and Y-Z plane respectively of the lighting system 10. It is to be noted that some secondary elements are omitted in the drawings for more clearly illustrating the detailed structures of the embodiments of the present invention.

As shown in FIG. 1, the lighting system 10 includes an LED light source 100, a convex lens 200, and a light guide post 300, and the light guide post 300 is disposed between the LED light source 100 and the convex lens 200. The light guide post 300 includes a light emitting portion 310 and a light collecting portion 320, and the light collecting portion 320 is connected to the light emitting portion 310. The light emitting portion 310 has a light guide post-light emitting surface 330, and the light guide post-light emitting surface 330 is facing the convex lens 200. The light collecting portion 320 has an internal reflective surface 340, and the internal reflective surface 340 includes at least an elliptical surface. The elliptical surface has a first focal point F1 and a second focal point F2. The second focal point F2 is located between the first focal point F1 and the convex lens 200, and the second focal point F2 is located inside the light guide post 300.

In some embodiments, the LED light source 100 is located close to the first focal point F1. In some other embodiments, the LED light source 100 may be located substantially at the first focal point F1. In some embodiments, the focal point of the convex lens 200 is located close to the second focal point F2. In some other embodiments, the focal point of the convex lens 200 may be located substantially at the second focal point F2.

As shown in FIG. 1, the lighting system 10 has an optical axis OA, and the optical axis OA is extending such as along the Y direction as shown in FIG. 1. In the embodiment, as shown in FIG. 1, the light emitting portion 310 has a first maximum cross-sectional width W1 along a direction perpendicular to the optical axis OA, the light collecting portion 320 has a second maximum cross-sectional width W2 along the direction perpendicular to the optical axis OA, and the first maximum cross-sectional width W1 is larger than the second maximum cross-sectional width W2.

In one embodiment, the first maximum cross-sectional width W1 may be less than, for example, three times the second maximum cross-sectional width W2; i.e. W1<W2*3.

In the embodiment, the light guide post-light emitting surface 330 of the light emitting portion 310 is a flat surface or a curved convex surface toward the convex lens 200. For example, in the embodiment as shown in FIG. 1, the light guide post-light emitting surface 330 of the light emitting portion 310 is a curved convex surface toward the convex lens 200.

In the embodiments, the area of the light guide post-light emitting surface 330 is substantially larger than the area of the interface between the light emitting portion 310 and the light collecting portion 320. In the embodiments, the shape of the light guide post-light emitting surface 330 may be, for example, circle or polygon, but not limited thereto. The boundary shape of the emitting lights would be similar to the shape of the light guide post-light emitting surface 330, such that the pattern of the emitting lights can be adjusted by changing the shape of the light guide post-light emitting surface 330. In some embodiments, the light guide post-light emitting surface 330 may be, for example, perpendicular to the optical axis OA. In some embodiments, the light guide post-light emitting surface 330 may be slightly off the perpendicular plane of the optical axis OA as well. According to the embodiments of the present invention, the amount of the lights emitted from the light guide post-light emitting surface 330 is, for example, equal to or higher than 65% of the amount of the lights emitted from the LED light source 100.

In the embodiments, as shown in FIG. 1, the light emitting portion 310 has a first length L1 along the direction of the optical axis OA, the light collecting portion 320 has a second length L2 along the direction of the optical axis OA, and the first length L1 is smaller than the second length L2.

According to the embodiments of the present invention, the structure of the light emitting portion 310 is helpful for collecting stray lights, and thus the light emitting efficiency is further increased accordingly.

In the embodiments, as shown in FIG. 1, the light collecting portion 320 further has a light guide post-light input surface 350. The light guide post-light input surface 350 is facing the LED light source 100, and the light guide post-light input surface 350 is a curved concave surface toward inside the light collecting portion 320. In the embodiments, the LED light source 100 may be disposed inside the recess formed from the curved surface of the light guide post-light input surface 350.

The curved surface of the light guide post-light input surface 350 can increase light collecting efficiency, that is, the amount of lights collected into the light guide post 300 can be increased. In addition, compared to the design of a flat light guide post-light input surface, in order to increase the amount of collected lights, the flat light guide post-light input surface has to be disposed close to the LED light source 100 yet avoiding contacting the LED light source 100, such that the manufacturing process is difficult, and the gap between the LED light source 100 and the flat light guide post-light input surface may cause leakages of large-angle lights. Therefore, according to the embodiments of the present invention, the curved surface of the light guide post-light input surface 350 can reduce the difficulties of assembling processes.

In one embodiment, the light guide post-light input surface 350 is, for example, a spherical concave surface toward inside the light collecting portion 320, and the LED light source 100 may be located at the focal point of the spherical concave surface. As such, refraction would not occur when lights pass through the light guide post-light input surface 350 and enter the light collecting portion 320.

In the embodiments, the convex lens 200 is a plane-convex lens or a double convex lens, and the convex lens 200 is a spherical lens or an aspherical lens. In the embodiments, the material of the convex lens 200 may be glass or plastic. For example, in the embodiment as shown in FIG. 1, the convex lens 200 is a plane-convex lens. In some embodiments, the convex lens 200 is, for example, a fish-eye lens. According to the embodiments of the present invention, the amount of the lights emitted from the convex lens-light emitting surface 220 of the convex lens 200 is such as equal to or higher than 40% of the amount of the lights emitted from the LED light source 100.

In the embodiments, as shown in FIGS. 2A-2B, the lighting system 10 may further include a substrate 500, and the LED light source 100 is disposed on the substrate 500. In the embodiments, the LED light source 100 and the light guide post 300 are separated from each other. In the embodiments, the substrate 500 is such as a printed circuit board (PCB).

In the embodiments as shown in FIGS. 1 and 2A-2B, the whole internal reflective surface 340 of the light collecting portion 320 is an elliptical surface, and the cross-sections of the light guide post 300 along the direction of the optical axis OA all have symmetrical shapes.

Figure 3:
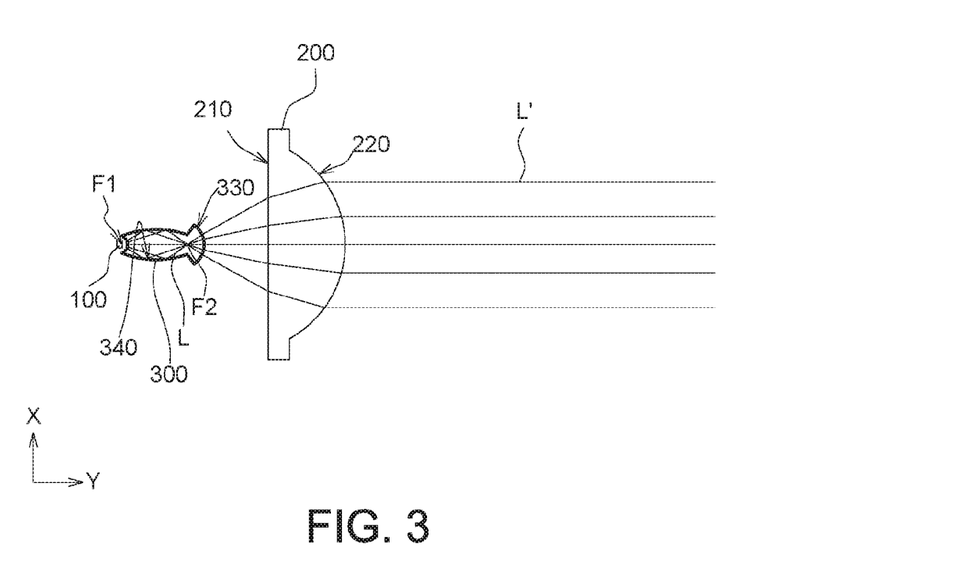
FIG. 3 shows a schematic drawing of optical paths of a lighting system according to an embodiment of the present invention.

Please refer to FIG. 3, which shows a schematic drawing of optical paths of a lighting system 10 according to an embodiment of the present invention. As shown in FIG. 3, the LED light source 100 is located close to the first focal point F1, and the focal point of the convex lens 200 is located at the second focal point F2, such that the energy of lights of the LED light source 100 can be re-collected, most of the lights emitted from the LED light source 100 can be focused at the second focal point F2 through the light guide post 300, the convex lens 200 can collect the lights emitted from the light guide post 300 and emit lights at small emission angles from the lighting system 100, achieving effects of ultra-high intensities of projected lights.

Specifically speaking, as shown in FIG. 3, most of the lights L emitted from the LED light source 100 are reflected by the internal reflective surface 340 of the light collecting portion 320 to be converged at the second focal point F2, and then emitted from the light guide post-light emitting surface 330 of the light emitting portion 310 followed by entering the convex lens 200 through the convex lens-light input surface 210. Due to the fact that the focal point of the convex lens 200 is substantially located at the second focal point F2, the emission angle of the lights L' emitted from the convex lens-light emitting surface 220 of the convex lens 200 is thus very small; that is, the lights L' are almost parallel and collimated lights emitted from the convex lens-light emitting surface 220 of the convex lens 200. In other words, through the design of the elliptical surface of the internal reflective surface 340 of the light collecting portion 320 together with the light guide post-light emitting surface 330 of the light emitting portion 310, lights can be effectively focused on the focal plane of the convex lens 200, achieving effects of providing collimated lights with high intensities and small emission angles and having high luminous efficiency of 65% or higher.

The design of the lighting system is to make the focal point of the convex lens 200 be close to or substantially locate at the second focal point of the elliptical surface, and if the second focal point is located outside the light guide post 300, influences of refraction caused by lights passing through the interface between the light guide post 300 and air has to be further considered in order to confirm the actual position of the second focal point. As such, the design of locating the second focal point outside the light guide post 300 is unfavorable to the confirmation of the position of the focal point, and thus is further disadvantageous to disposing the convex lens 200. In contrast, according to the embodiments of the present invention, the second focal point F2 is located inside the light guide post 300, such that it is easier to confirm the position of the second focal point F2, and thus it is further advantageous to disposing the convex lens 200.

Figure 4A:
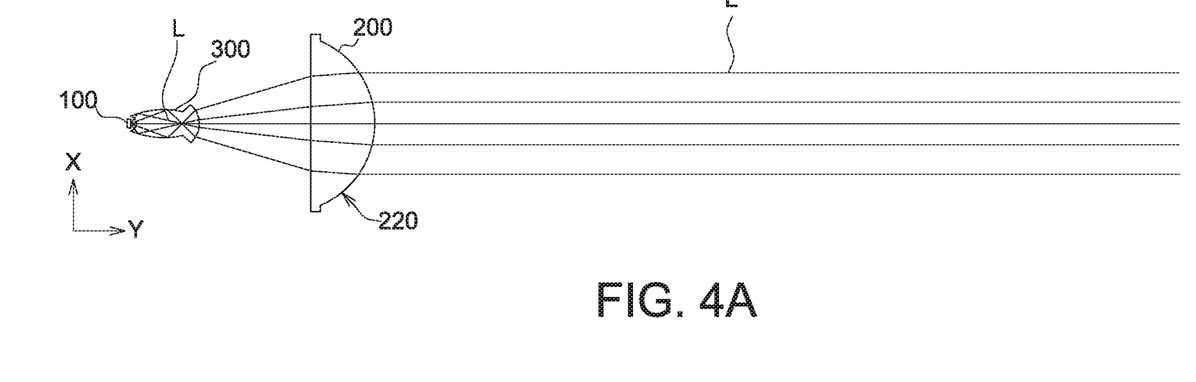
FIGS. 4A and 4B show schematic drawings of optical paths along X-Y plane and Y-Z plane respectively of a lighting system according to an embodiment of the present invention.
Figure 4B:
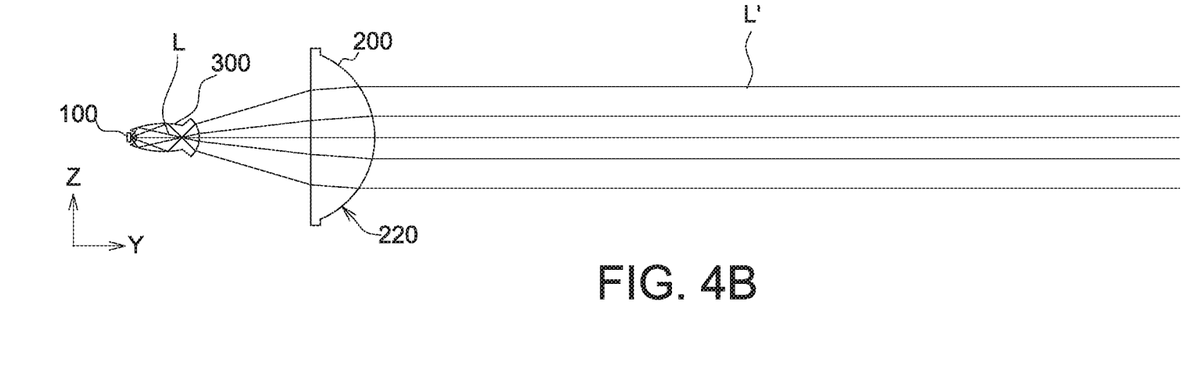
Figure 5:
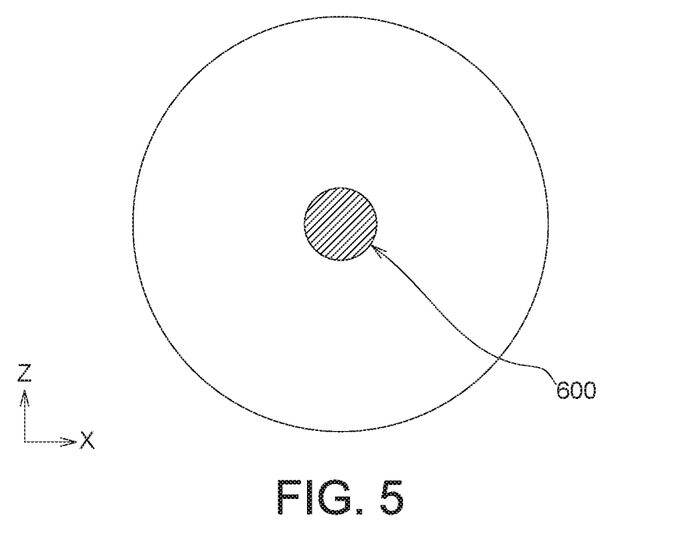
FIG. 5 shows a schematic drawing of a light pattern along the direction perpendicular to the optical axis of a lighting system according to an embodiment of the present invention.

FIGS. 4A and 4B show schematic drawings of optical paths along X-Y plane and Y-Z plane respectively of a lighting system 10 according to an embodiment of the present invention, and FIG. 5 shows a schematic drawing of a light patterns along the direction perpendicular to the optical axis OA of the lighting system 10. The schematic drawing of optical paths as shown in FIG. 3 can be regarded as equal to the schematic drawing of optical paths along X-Y plane as shown in FIG. 4A.

As shown in FIGS. 4A-4B, when the cross-sections of the light guide post 300 along the direction of the optical axis OA (Y direction) all have symmetrical shapes, in other words, the cross-sectional widths of the light guide post 300 along a direction perpendicular to the optical axis OA (e.g. X direction and Z direction) are all the same, lights L are reflected by the internal reflective surface 340 to be focused on the second focal point F2, and then lights L' emitted from the convex lens-light emitting surface 220 of the convex lens 200 all have very small emission angles. That is, regardless viewing from any plane parallel to the optical axis (e.g. X-Y plane or Y-Z plane), lights L' are almost parallel and collimated lights emitted from the convex lens-light emitting surface 220 of the convex lens 200. Furthermore, as shown in FIG. 5, the light pattern 600 of the lights L' is substantially a circle.

Figure 6A:
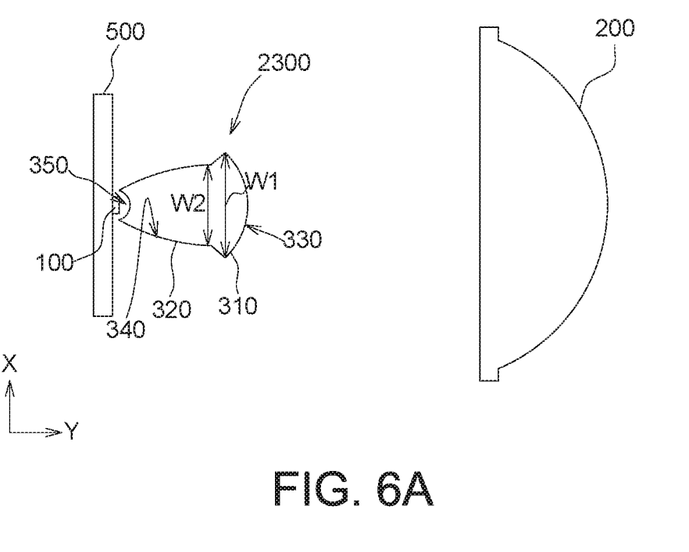
FIGS. 6A and 6B show cross-sectional views along X-Y plane and Y-Z plane respectively of a lighting system according to another embodiment of the present invention.
Figure 6B:
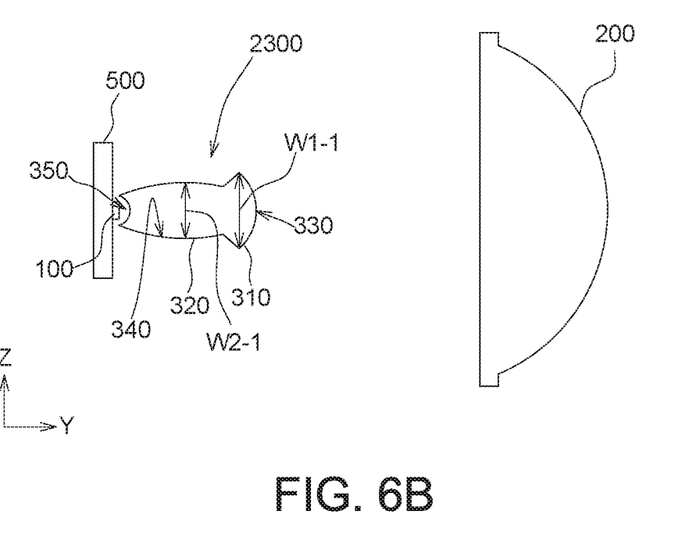

FIGS. 6A and 6B show cross-sectional views along X-Y plane and Y-Z plane respectively of a lighting system 20 according to another embodiment of the present invention. It is to be noted that some secondary elements are omitted in the drawings for more clearly illustrating the detailed structures of the embodiments of the present invention. The elements in the present embodiment sharing similar or the same labels with those in the previous embodiment are similar or the same elements, and the description of which is omitted.

As shown in FIGS. 6A-6B, the lighting system 20 includes an LED light source 100, a convex lens 200, and a light guide post 2300, and the light guide post 2300 is disposed between the LED light source 100 and the convex lens 200. The light guide post 2300 includes a light emitting portion 310 and a light collecting portion 320, and the light collecting portion 320 is connected to the light emitting portion 310. The light emitting portion 310 has a light guide post-light emitting surface 330, and the light guide post-light emitting surface 330 is facing the convex lens 200. The light collecting portion 320 has an internal reflective surface 340, and the internal reflective surface 340 includes at least an elliptical surface. The elliptical surface has a first focal point F1 and a second focal point F2. The second focal point F2 is located between the first focal point F1 and the convex lens 200, and the second focal point F2 is located inside the light guide post 2300.

In some embodiments, the internal reflective surface 340 of the light collecting portion 320 may further include an additional elliptical surface, a curved surface, a parabolic surface, a hyperbolic surface, or any combination thereof. In the embodiment as shown in FIGS. 6A-6B, the internal reflective surface 340 of the light collecting portion 320 has two elliptical surfaces arranged oppositely along the Y-Z cross-section, and each of the cross-sections of the light guide post 2300 along the direction of the optical axis OA has an in-symmetric shape.

For example, in the present embodiment, as shown in FIGS. 6A-6B, the light emitting portion 310 has a first maximum cross-sectional width W1 along a direction perpendicular to the optical axis OA (e.g. X direction), the light emitting portion 310 further has a light emitting portion cross-sectional width W1-1 along an another direction perpendicular to the optical axis OA (e.g. Z direction), an extending direction of the light emitting portion cross-sectional width W1-1 is different from an extending direction of the first maximum cross-sectional width W1, and the light emitting portion cross-sectional width W1-1 is smaller than the first maximum cross-sectional width W1. For example, as shown in FIGS. 6A-6B, the first maximum cross-sectional width W1 extends along the X direction, and the light emitting portion cross-sectional width W1-1 extends along the Z direction.

For example, in the present embodiment, as shown in FIGS. 6A-6B, the light collecting portion 320 has a second maximum cross-sectional width W2 along a direction perpendicular to the optical axis OA (e.g. X direction), the light collecting portion 320 further has a light collecting portion cross-sectional width W2-1 along an another direction perpendicular to the optical axis OA (e.g. Z direction), an extending direction of the light collecting portion cross-sectional width W2-1 is different from an extending direction of the second maximum cross-sectional width W2, and the light collecting portion cross-sectional width W2-1 is smaller than the second maximum cross-sectional width W2. For example, as shown in FIGS. 6A-6B, the second maximum cross-sectional width W2 extends along the X direction, and the light collecting portion cross-sectional width W2-1 extends along the Z direction.

Figure 7A:
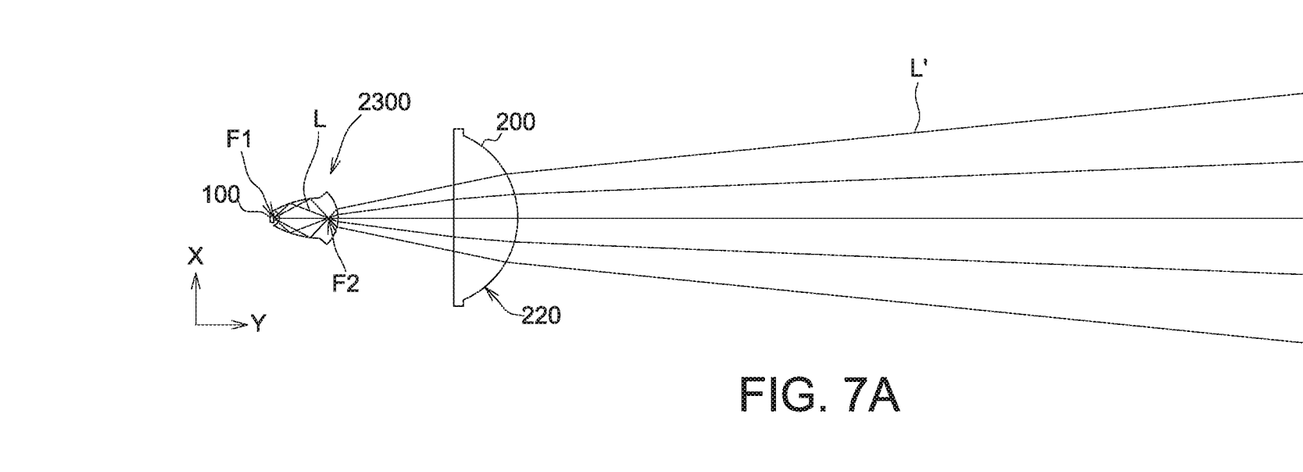
FIGS. 7A and 7B show schematic drawings of optical paths along X-Y plane and Y-Z plane respectively of a lighting system according to another embodiment of the present invention.
Figure 7B:
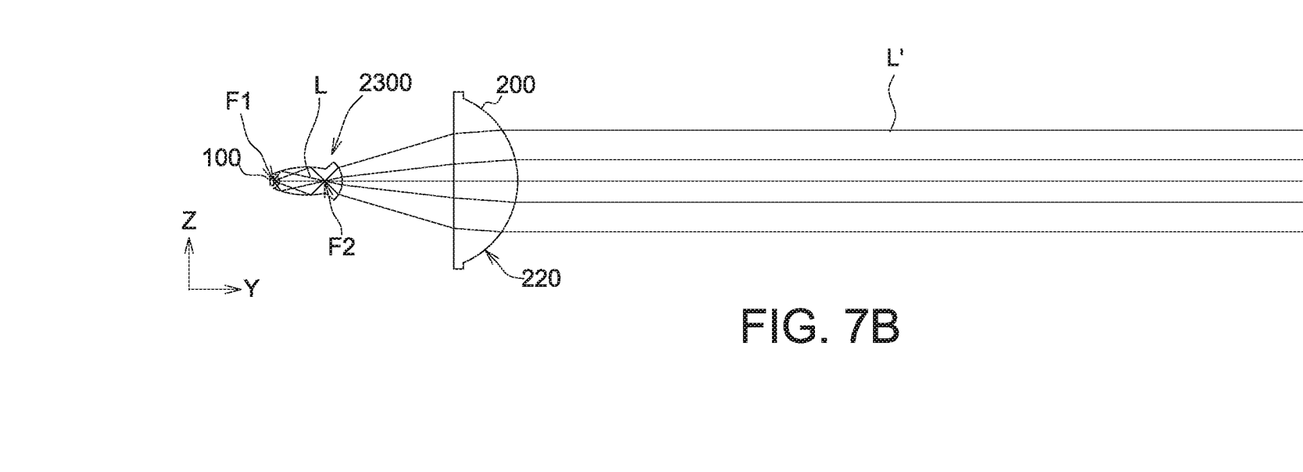
Figure 8:
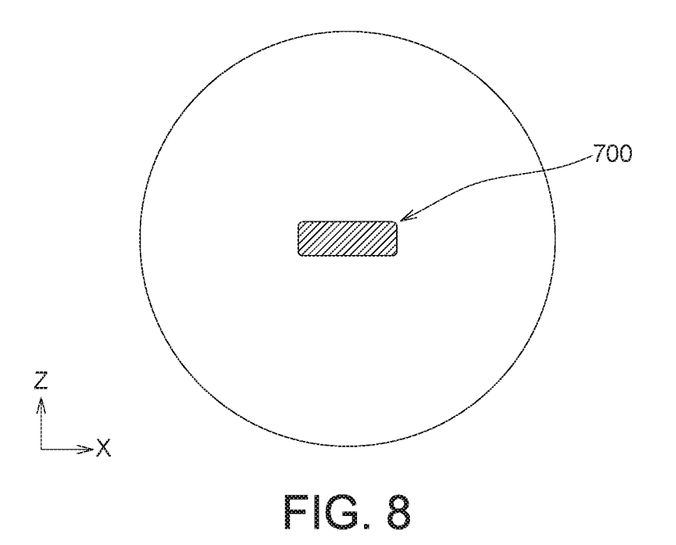
FIG. 8 shows a schematic drawing of a light pattern along the direction perpendicular to the optical axis of a lighting system according to another embodiment of the present invention.

FIGS. 7A and 7B show schematic drawings of optical paths along X-Y plane and Y-Z plane respectively of a lighting system 20 according to another embodiment of the present invention, and FIG. 8 shows a schematic drawing of a light pattern along the direction perpendicular to the optical axis OA of the lighting system 20.

As shown in FIGS. 7A-7B, when each of the cross-sections of the light guide post 2300 along the direction of the optical axis OA (Y direction) has an in-symmetrical shape, in other words, the cross-sectional widths of the light guide post 2300 along different directions perpendicular to the optical axis OA (e.g. X direction and Z direction) are different, lights L are reflected by the internal reflective surface 340 to be focused on the second focal point F2, and then lights L' emitted from the convex lens-light emitting surface 220 of the convex lens 200 would have different emission angles at different directions perpendicular to the optical axis OA. For example, as shown in FIG. 7B, when viewing from Y-Z plane which is parallel to the optical axis OA, lights L' are almost parallel and collimated lights emitted from the convex lens-light emitting surface 220 of the convex lens 200. However, as shown in FIG. 7A, when viewing from X-Y plane which is parallel to the optical axis OA, lights L' emitted from the convex lens-light emitting surface 220 of the convex lens 200 have larger emission angles. Furthermore, as shown in FIG. 8, the light pattern 700 of the lights L' is substantially a rectangle.

According to the results as shown in FIGS. 5 and 8, light patterns of emitted lights can be adjusted by adjusting the shapes of the cross-sections of the light guide post along the direction of the optical axis OA.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lighting system, comprising:
an LED light source;
a convex lens; and
a light guide post disposed between the LED light source and the convex lens, the light guide post comprising:
a light emitting portion having a light guide post-light emitting surface facing the convex lens; and
a light collecting portion connected to the light emitting portion, wherein the light collecting portion has an internal reflective surface, the internal reflective surface comprises at least an elliptical surface having a first focal point and a second focal point, the second focal point is located between the first focal point and the convex lens, and the second focal point is located inside the light guide post; wherein the lighting system has an optical axis, the light emitting portion has a first maximum cross-sectional width along a direction perpendicular to the optical axis, the light collecting portion has a second maximum cross-sectional width along the direction perpendicular to the optical axis, the first maximum cross-sectional width is larger than the second maximum cross-sectional width, and the first maximum cross-sectional width is less than three times the second maximum cross-sectional width.

2. The lighting system according to claim 1, wherein the LED light source is located at the first focal point.

3. A lighting system, comprising:
an LED light source;
a convex lens; and
a light guide post disposed between the LED light source and the convex lens, the light guide post comprising:
a light emitting portion having a light guide post-light emitting surface facing the convex lens; and
a light collecting portion connected to the light emitting portion, wherein the light collecting portion has an internal reflective surface, the internal reflective surface comprises at least an elliptical surface having a first focal point and a second focal point, the second focal point is located between the first focal point and the convex lens, and the second focal point is located inside the light guide post; wherein the lighting system has an optical axis, the light emitting portion has a first maximum cross-sectional width along a direction perpendicular to the optical axis, the light collecting portion has a second maximum cross-sectional width along the direction perpendicular to the optical axis, the first maximum cross-sectional width is larger than the second maximum cross-sectional width, wherein the light emitting portion further has a light emitting portion cross-sectional width along an another direction perpendicular to the optical axis, an extending direction of the light emitting portion cross-sectional width is different from an extending direction of the first maximum cross-sectional width, and the light emitting portion cross-sectional width is smaller than the first maximum cross-sectional width.

4. A lighting system, comprising:
an LED light source;
a convex lens; and
a light guide post disposed between the LED light source and the convex lens, the light guide post comprising:
a light emitting portion having a light guide post-light emitting surface facing the convex lens; and
a light collecting portion connected to the light emitting portion, wherein the light collecting portion has an internal reflective surface, the internal reflective surface comprises at least an elliptical surface having a first focal point and a second focal point, the second focal point is located between the first focal point and the convex lens, and the second focal point is located inside the light guide post; wherein the lighting system has an optical axis, the light emitting portion has a first maximum cross-sectional width along a direction perpendicular to the optical axis, the light collecting portion has a second maximum cross-sectional width along the direction perpendicular to the optical axis, the first maximum cross-sectional width is larger than the second maximum cross-sectional width, wherein the light collecting portion further has a light collecting portion cross-sectional width along an another direction perpendicular to the optical axis, an extending direction of the light collecting portion cross-sectional width is different from an extending direction of the second maximum cross-sectional width, and the light collecting portion cross-sectional width is smaller than the second maximum cross-sectional width.

5. The lighting system according to claim 1, wherein the lighting system has an optical axis, the light emitting portion has a first length along a direction of the optical axis, the light collecting portion has a second length along the direction of the optical axis, and the first length is smaller than the second length.

6. The lighting system according to claim 1, wherein the light collecting portion further has a light guide post-light input surface facing the LED light source, and the light guide post-light input surface is a curved concave surface toward inside the light collecting portion.

7. The lighting system according to claim 6, wherein the light guide post-light input surface is a spherical concave surface toward inside the light collecting portion.

8. The lighting system according to claim 1, wherein the internal reflective surface of the light collecting portion further comprises an additional elliptical surface, a curved surface, a parabolic surface, a hyperbolic surface, or any combination thereof.

9. The lighting system according to claim 1, wherein the light guide post-light emitting surface of the light emitting portion is a flat surface or a curved convex surface toward the convex lens.

10. The lighting system according to claim 1, wherein the convex lens is a plane-convex lens or a double convex lens, and the convex lens is a spherical lens or an aspherical lens.

\* \* \* \* \*